United States Patent
Lottis et al.

(10) Patent No.: US 7,620,137 B2
(45) Date of Patent: Nov. 17, 2009

(54) SYSTEM AND METHOD FOR CLOCK DRIFT CORRECTION FOR BROADCAST AUDIO/VIDEO STREAMING

(75) Inventors: Kent D. Lottis, Bellevue, WA (US); Meir E. Abergel, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 499 days.

(21) Appl. No.: 10/987,942

(22) Filed: Nov. 13, 2004

(65) Prior Publication Data

US 2006/0104397 A1    May 18, 2006

(51) Int. Cl.
*H04L 25/00* (2006.01)

(52) U.S. Cl. ......... 375/372; 375/354; 375/376; 375/362; 375/374; 455/502; 370/516; 370/252; 370/350; 370/389; 709/200

(58) Field of Classification Search ......... 375/354, 375/372, 376, 362; 709/200; 370/516, 252; 370/389, 350; 455/502
See application file for complete search history.

(56) References Cited

U.S. PATENT DOCUMENTS

| | | | | |
|---|---|---|---|---|
| 5,663,962 A | * | 9/1997 | Caire et al. | 370/535 |
| 5,852,630 A | * | 12/1998 | Langberg et al. | 375/219 |
| 6,880,098 B1 | * | 4/2005 | Huntsman | 713/400 |
| 7,158,481 B1 | * | 1/2007 | Saari | 370/235 |
| 7,254,310 B2 | * | 8/2007 | Gates et al. | 386/46 |
| 7,415,044 B2 | * | 8/2008 | Kallstenius | 370/516 |
| 2004/0186877 A1 | * | 9/2004 | Wang et al. | 709/200 |
| 2005/0220240 A1 | * | 10/2005 | Lesso | 375/372 |

* cited by examiner

*Primary Examiner*—Shuwang Liu
*Assistant Examiner*—Helene Tayong
(74) *Attorney, Agent, or Firm*—Merchant & Gould, P.C.

(57) ABSTRACT

A clock rate used in rendering broadcast streaming audio/video data is adjusted to converge on a clock rate associated with broadcasting the streaming data. The clock rate is adjusted by monitoring the buffer depth associated with a receive buffer that stores the incoming streaming data. The buffer depth provides an estimate of clock drift between the two clock rates. From the estimate of clock drift, the clock rate used in rendering broadcast streaming data is adjusted to avoid the clock drift causing skips or pauses in the rendered audio/video data.

22 Claims, 6 Drawing Sheets

SYSTEM AND METHOD FOR CLOCK DRIFT CORRECTION FOR BROADCAST AUDIO/VIDEO STREAMING

BACKGROUND OF THE INVENTION

Audio/Video streaming technologies are widely used for broadcasting multimedia content across the Internet. Streaming refers to a technique for transferring data such that it can be processed as a steady and continuous stream. Streaming provides a useful download method since many users do not have fast enough access to download large multimedia files quickly. With streaming, the client browser may start displaying the data before the entire file has been transmitted.

For streaming to work however, the server side transmitting the data collects the data and sends it as a steady stream to the application that is processing the data and converting it to sound or pictures. If the streaming client receives the data more quickly than required, it needs to save the excess data in a buffer. If the buffer fills too quickly, the buffer may become full and some data may be skipped since it wasn't stored. In contrast, if the data doesn't come quickly enough, then the buffer may empty and the data delivered to the application that is processing the data and converting it to sound or pictures may need to be paused to allow the buffer to fill to a reasonable level.

The shortcomings of streaming data have significant implications for broadcast audio/video applications across the Internet. Currently, much of multimedia transferred across the Internet is free. However, streaming technologies are advancing into the pay arena, where users pay for content. Providers of the content therefore have a great need to provide streaming data with as few glitches as possible, so that the client is satisfied with paying for the service. Furthermore, live applications that do not allow the data to be paused, such as network conferencing, also need a solution to provide integrity of the audio/video output and prevent losses of portions of the multimedia being transmitted. In addition, a solution is also needed for other broadcast scenarios exist where synchronizing the input and processing of the data is problematic, such as when a single server is broadcasting to multiple clients.

SUMMARY OF THE INVENTION

Embodiments of the present invention are related to a system and method for clock drift correction of broadcast audio/video streaming data. The present invention provides a clock rate convergence that corresponds to the ideal buffer depth of a receive buffer in an audio/video streaming system. The clock rate that controls the processing of the audio/video data associated with a multimedia file is continuously adjusted to maintain a selected buffer depth within the receive buffer of the system.

In accordance with one aspect of the present invention, an estimated buffer depth associated with a receive buffer is determined. Using the estimated buffer depth, a clock drift of the received data stream may also be estimated. A clock rate adjustment level is determined that is associated with the clock drift. The clock rate associated with rendering the data stream is adjusted according to the clock rate adjustment level, such that the adjustment compensates for the clock drift and converges the buffer depth onto a selected buffer depth.

In accordance with another aspect of the present invention, a system is provided for correcting clock drift associated with a received data stream. The system includes a receive buffer that is configured to store the received data stream. The received data stream is stored in the receive buffer at a first clock rate. A filter graph is configured to retrieve the received data stream from the receive buffer and process the received data stream for rendering. A clock rate converter is configured to provide a second clock rate that is associated with rendering the received data stream. In addition, a clock rate convergence controller is configured to estimate the clock drift between the first clock rate and the second clock rate, and is configured to provide a signal to the clock rate converter to adjust the second clock rate so that the second clock rate converges on the first clock rate.

In accordance with still another aspect of the present invention, a computer-readable medium includes instructions for storing a data stream in a receive buffer according to a first clock rate. The data stream is pulled from the receive buffer according to a second clock rate. The data stream pulled from the receive buffer is processed with a filter graph to render and output the received data stream. Instantaneous buffer depths associated with a receive buffer are estimated at selected intervals of time. The instantaneous buffer depths are combined into a buffer depth response. A clock drift of the received data stream is estimated from the estimated buffer depth response. A clock rate adjustment level associated with the estimated clock drift is then determined. The second clock rate is then adjusted according to the clock rate adjustment level, such that the adjustment compensates for the clock drift and converges on an optimal buffer depth.

DETAILED DESCRIPTION

The present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
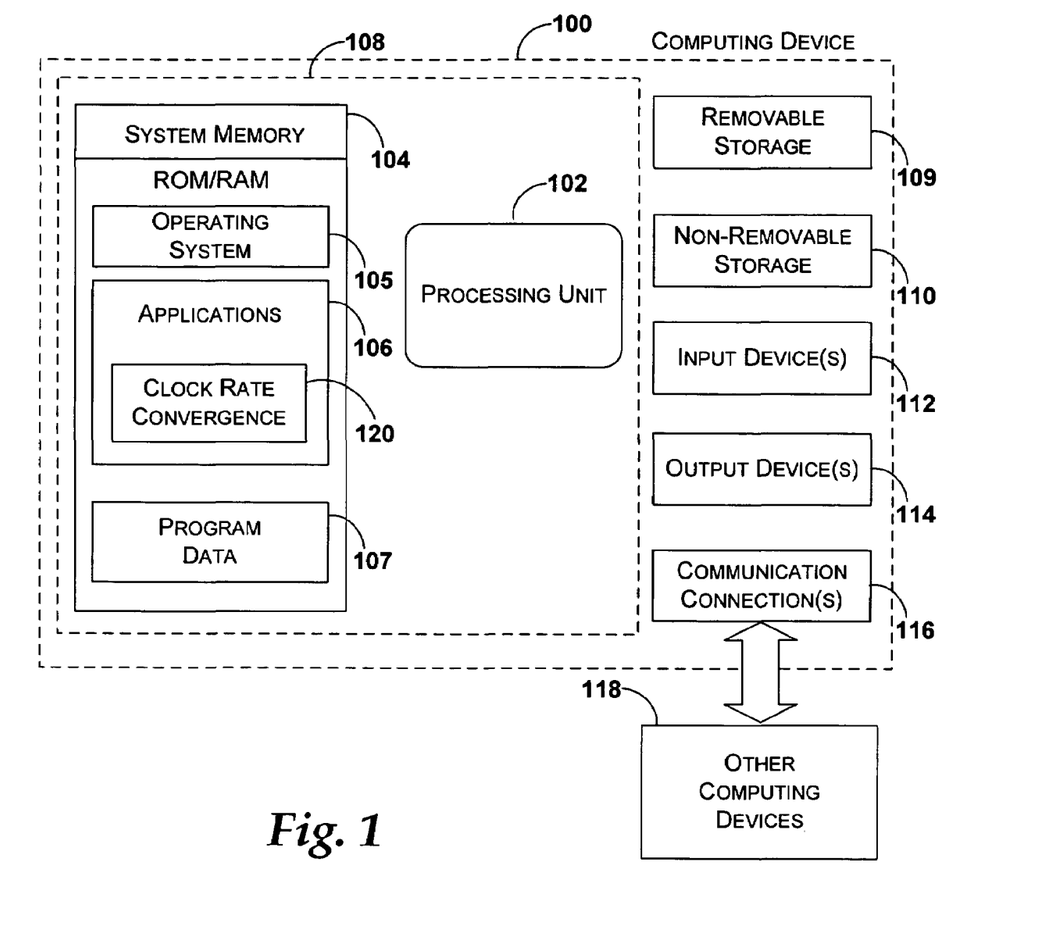
FIG. 1 illustrates an exemplary computing device that may be used in one exemplary embodiment of the present invention.

With reference to FIG. 1, one exemplary system for implementing the invention includes a computing device, such as computing device 100. Computing device 100 may be configured as a client, a server, mobile device, or any other computing device. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 includes a clock rate convergence application 120 for implementing the functionality of the present invention. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
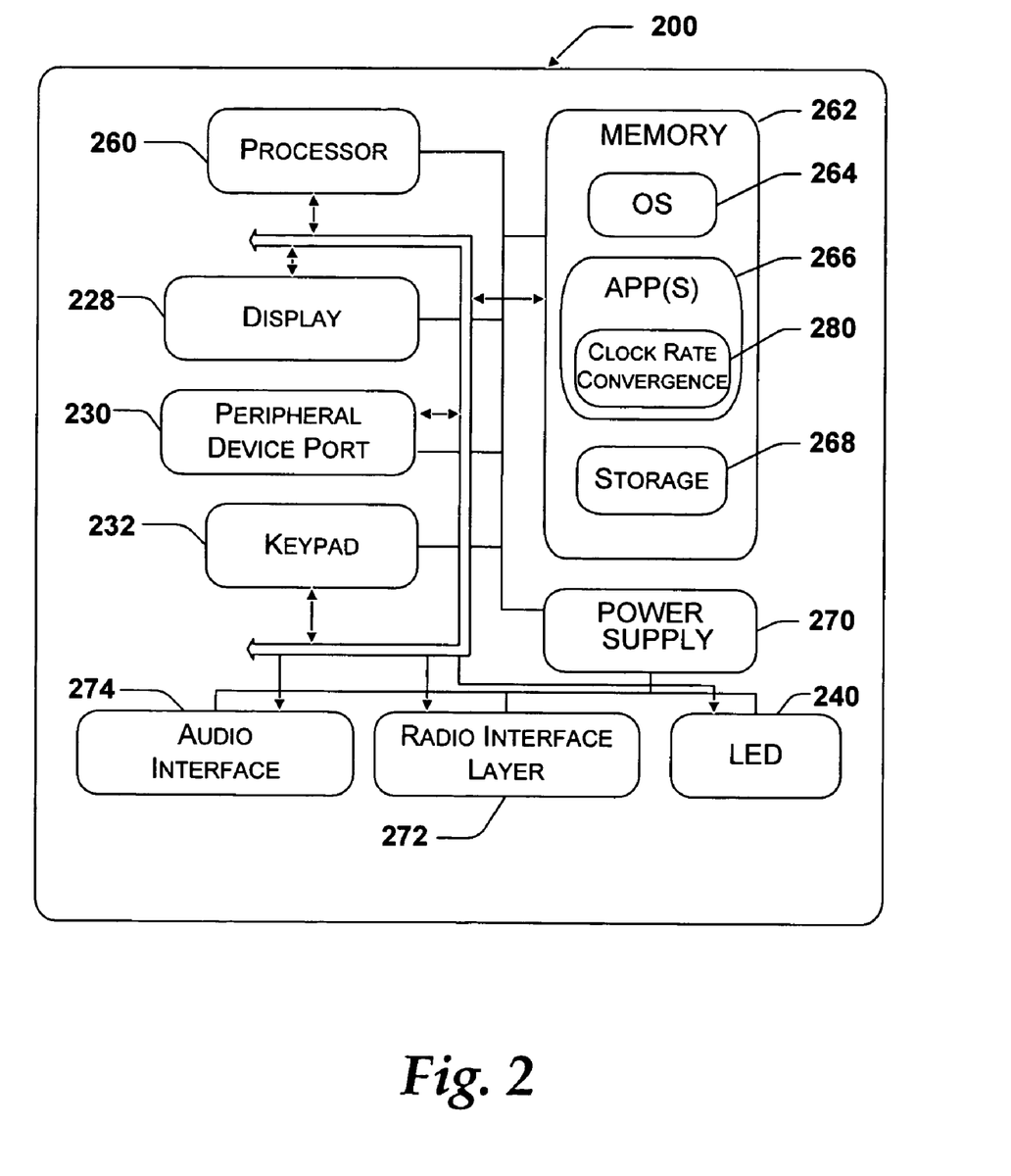
FIG. 2 illustrates an exemplary mobile device that may be used in one exemplary embodiment of the present invention.

FIG. 2 shows an alternative operating environment for a mobile device substantially for use in the present invention. In one embodiment of the present invention, mobile device 200 is integrated as a computing device, such as an integrated personal digital assistant (PDA) and wireless phone.

In this embodiment, mobile device 200 has a processor 260, a memory 262, a display 228, and a keypad 232. Memory 262 generally includes both volatile memory (e.g., RAM) and non-volatile memory (e.g., ROM, Flash Memory, or the like). Mobile device 200 includes an operating system 264, which is resident in memory 262 and executes on processor 260.

Keypad 232 may be a push button numeric dialing pad (such as on a typical telephone), a multi-key keyboard (such as a conventional keyboard), or may not be included in the mobile device in deference to a touch screen or stylus. Display 228 may be a liquid crystal display, or any other type of display commonly used in mobile computing devices. Display 228 may be touch-sensitive, and would then also act as an input device.

One or more application programs 266 are loaded into memory 262 and run on operating system 264. Examples of application programs include phone dialer programs, e-mail programs, scheduling programs, PIM (personal information management) programs, word processing programs, spreadsheet programs, Internet browser programs, and so forth. In one embodiment, application programs 266 include a clock rate convergence application 280 for implementing the functionality of the present invention. Mobile device 200 also includes non-volatile storage 268 within the memory 262. Non-volatile storage 268 may be used to store persistent information which should not be lost if mobile device 200 is powered down. The applications 266 may use and store information in storage 268, such as e-mail or other messages used by an e-mail application, contact information used by a PIM, appointment information used by a scheduling program, documents used by a word processing application, and the like. A synchronization application also resides on the mobile device and is programmed to interact with a corresponding synchronization application resident on a host computer to keep the information stored in the storage 268 synchronized with corresponding information stored at the host computer.

Mobile device 200 has a power supply 270, which may be implemented as one or more batteries. Power supply 270 might further include an external power source, such as an AC adapter or a powered docking cradle that supplements or recharges the batteries.

Mobile device 200 is also shown with two types of external notification mechanisms: an LED 240 and an audio interface 274. These devices may be directly coupled to power supply 270 so that when activated, they remain on for a duration dictated by the notification mechanism even though processor 260 and other components might shut down to conserve battery power. LED 240 may be programmed to remain on indefinitely until the user takes action to indicate the powered-on status of the device. Audio interface 274 is used to provide audible signals to and receive audible signals from the user. For example, audio interface 274 may be coupled to a speaker for providing audible output and to a microphone for receiving audible input, such as to facilitate a telephone conversation.

Mobile device 200 also includes a radio 272 that performs the function of transmitting and receiving radio frequency communications. Radio 272 facilitates wireless connectivity between the mobile device 200 and a wide area network via a communications carrier or service provider. Transmissions to and from the radio 272 are conducted under control of the operating system 264. In other words, communications received by the radio 272 may be disseminated to application programs 266 via the operating system 264, and vice versa.

The radio 272 allows the mobile device 200 to communicate with other computing devices, such as over a network. The radio 272 is one example of communication media.

Clock Rate Convergence

Embodiments of the present invention are related to a method for converging the clock rate used for rendering audiovideo data to a clock rate that corresponds to an optimal buffer depth. By converging on an optimal clock rate, the buffer of received data maintains a selected range and eliminates skips and pauses in the output of the audiovideo data.

Figure 3:
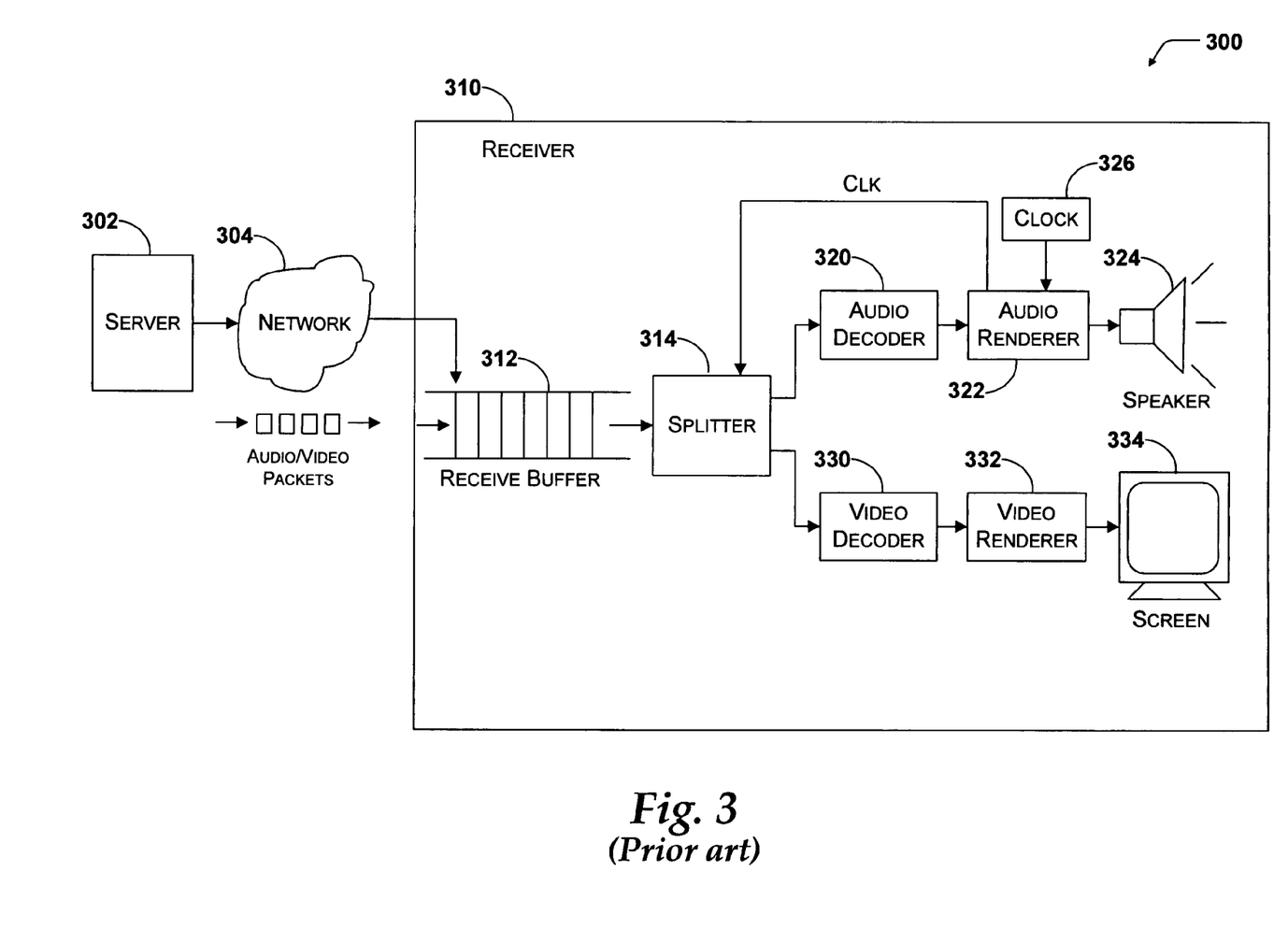
FIG. 3 illustrates a portion of a prior art system for broadcast audio/video streaming.

FIG. 3 illustrates a portion of a prior art system for broadcast audio/video streaming. System 300 includes server 302, network 304, and receiver 310. Receiver 312 includes receive buffer or pre-roll buffer 312, splitter 314, audio decoder 320, audio renderer 322, speaker 324, clock 326, video decoder 330, video renderer 332, and screen/display 334.

In operation, server 302 transmits audio/video packets corresponding to a broadcast multimedia file to receiver 310 across network 304. These packets are stored in receive buffer or pre-roll buffer 312. A number of filters then process the data for rendering to audio and video output devices. These filters include splitter 314, audio decoder 320, audio renderer 322, video decoder 330, and video renderer 332. Together these filters are referred to as a filter graph. In another embodiment, a filter graph manager (not shown) is included to generate the filter graph and manage the filters. Splitter 314 splits the packets according to their audio and video components. The audio portion of the broadcast file is output by speaker 324 after being processed by audio decoder 320 and audio renderer 322. The rate at which the audio is output is controlled by clock 326. Similarly, the video portion of the multimedia file is output on screen 334 after being processed by video decoder 330 and video renderer 332.

The data is transmitted across network 304 is received at receiver 310 at a rate that corresponds with a server clock (not shown). The rate at which the data is received may also be affected by the instantaneous traffic across network 310. Even though the packets of data are stored in receive buffer 312 as soon as received, a delay, referred to as a pre-roll delay, is used before the packets are pulled from receive buffer 312 for rendering. The pre-roll delay assures that the rendering of the data is continuous, where otherwise receive buffer 312 may be in danger of emptying almost immediately. The rate at which the packets are pulled from the receive buffer is controlled by clock 326 via a clock signal (CLK) provided to splitter 314 by audio renderer 322. Clock 326 may be a system clock or hardware clock that provides a consistently timed signal. Clock 326 also provides the basis for the timing for propagating the data through the filters.

As time passes, the timing for pulling the packets from receive buffer 312 may drift from the timing used for storing packets in receive buffer 312. This drift is referred to as clock drift since it results from the difference between the server clock (not shown) and the clock signal (CLK) used for pulling the packets from receive buffer 312. If the clock drift increases enough, the drift will be manifest in the rendered audio and video as skips, pauses, or other undesired effects. Since prior art systems are not capable of discovering the rate of the server clock directly, prior art systems have dealt mainly with correction of adverse effects caused by clock drift rather than prevention of these effects.

Figure 4:
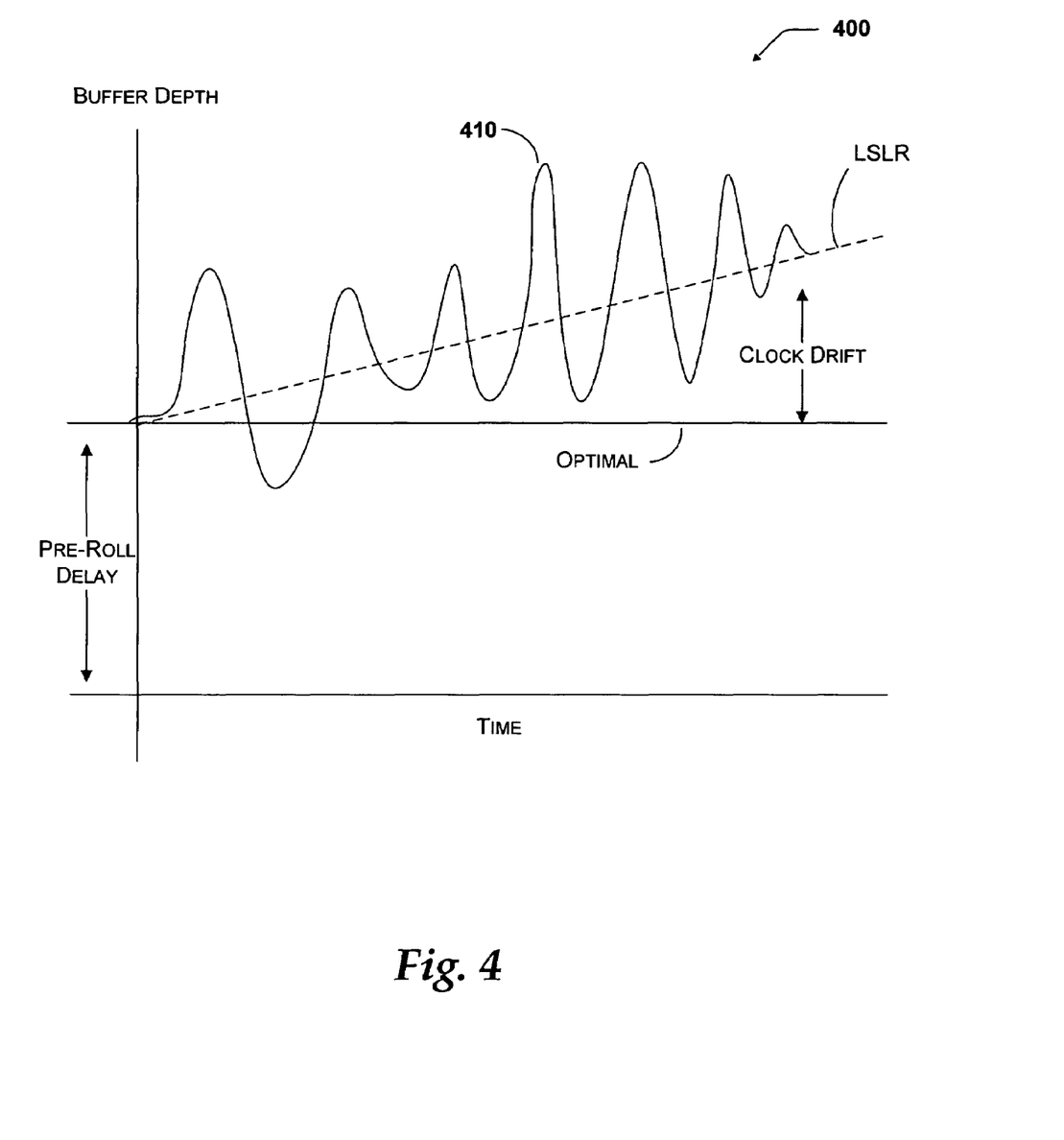
FIG. 4 illustrates an exemplary graph of prior art buffer depth behavior for the system of FIG. 3.

FIG. 4 illustrates an exemplary graph of prior art buffer depth behavior for the system of FIG. 3. Inventors of the present invention discovered that buffer depth variation within receive buffer 312 is a measure that provides an estimate of the clock drift for incoming and outgoing packets. Furthermore, the inventors have established a method for determining the long-term rate of change of the buffer depth. Buffer depth refers the number of audio/video packets currently residing in receive buffer 312 awaiting processing by the filters. Accordingly, buffer depth is the fill level of receive buffer 312, containing packets received from server 302 that are yet to be processed. In this example, due to the system used, buffer depth 410 may diverge greatly from an optimal buffer depth. An optimal buffer depth refers to a depth of receive buffer 312 that minimizes the danger that skips or pauses may occur in the output. Graph 400 illustrates an example where the buffer depth 410 over time produces a clock drift. A least squares linear regression calculation of the buffer depth average rate of change (i.e., fill rate) measurement produces an LSLR line that indicates that receive buffer 312 is filling too quickly, i.e. the fill rate is too high. Eventually a correction is required to adjust the buffer depth or the buffer will fill and incoming data will not be stored. According to prior art methods, a skip in the rendered audio/video signal is used to eliminate packets from the buffer and reduce the buffer depth In other words, the target fill rate is corrected by periodically either dropping samples from the buffer if the fill rate is too high, or pausing the playback if the fill rate is too low.

Figure 5:
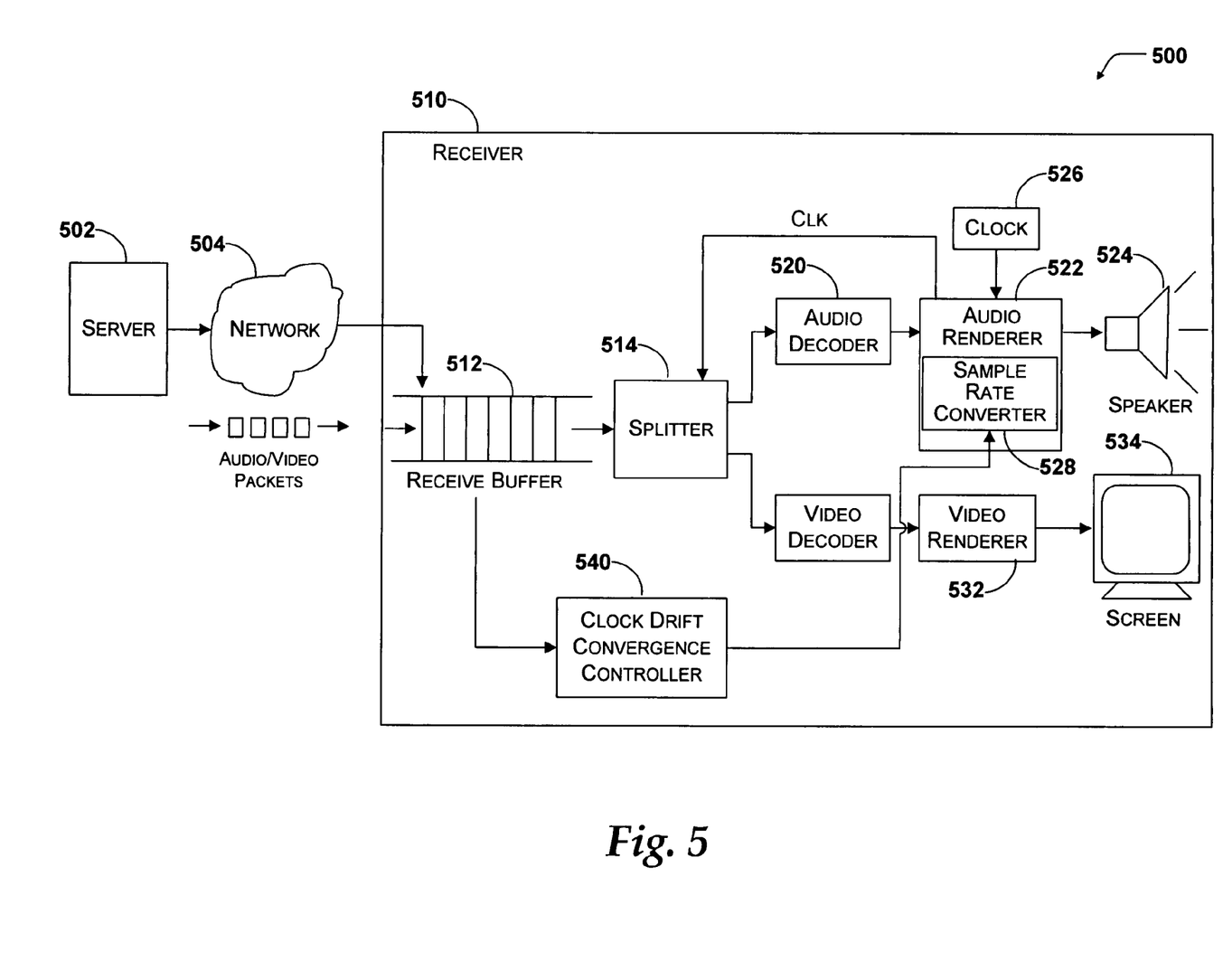
FIG. 5 illustrate a portion of a system for broadcast audio/video streaming in accordance with the present invention.

FIG. 5 illustrates a portion of a system for broadcast audio/video streaming in accordance with the present invention. System 500 includes server 502, network 504, and receiver 510. Receiver 512 includes receive buffer or pre-roll buffer 512, splitter 514, audio decoder 520, audio renderer 522, speaker 524, clock 526, video decoder 530, video renderer 532, screen/display 534, and clock drift convergence controller 540. Audio renderer 522 further includes sample rate converter 528.

System 500 operates similarly to system 300 shown in FIG. 3 above. Server 502 transmits audio/video packets corresponding to a broadcast multimedia file to receiver 510 across network 504. Server 502 may be any type of computing device configured to transmit information across a network. Network 504 may include the Internet, a local area network (LAN), a wide area network (WAN), a cellular network, or other type of network. The packets are stored in receive buffer or pre-roll buffer 512 at rate that corresponds to a server clock (not shown). A number of filters then process the data for rendering to audio and video output devices. In one embodiment, the filters include splitter 314, audio decoder 320, audio renderer 322, video decoder 330, and video renderer 332. In other embodiments, other filters are included or certain filters are separated into one or more filters (e.g., audio renderer is comprised of a mixer, a driver, a sample rate converter, and other elements). Together these filters are referred to as a filter graph. In another embodiment, a filter graph manager (not shown) is included to generate the filter graph and manage the filters. Splitter 514 splits the packets according to their audio and video components. The audio portion of the broadcast file is output by speaker 524 after being processed by audio decoder 520 and audio renderer 522. The rate at which the audio is output is controlled by clock 526. Similarly, the video portion of the multimedia file is output on screen 334 after being processed by video decoder 530 and video renderer 532.

The present invention corrects for the clock drift by additionally including clock drift convergence controller 540 and taking advantage of sample rate converter 528 included in audio renderer 522. Clock drift convergence controller 540 monitors the buffer depth of receive buffer 512. Clock drift convergence controller 540 records the instantaneous buffer depth at a selected time interval (e.g., 5 seconds). The instantaneous buffer depth is dependent on the number of packets, the size of the buffer, and the type of multimedia file associated with the packet. Depending on the type of multimedia file, each packet may be a certain size (e.g., each packet corresponds to 1 millisecond of data). Accordingly, a buffer containing a certain number of packets (e.g., 1000) has a buffer depth that corresponds to the number of packets (e.g., buffer depth of 1000 milliseconds when each packet is 1 millisecond in size). Over time, a least squares linear regression of the recorded instantaneous buffer depths is made to determine the slope and intercept corresponding to the buffer depth (see FIG. 6 below). The slope of line indicates whether the buffer depth is increasing or decreasing over time and therefore indicates the direction of the clock drift. The intercept corresponds to the difference from a selected optimal buffer depth or optimal pre-roll depth. Ideally, a slope of zero and an intercept corresponding optimal pre-roll depth is desired. Using the slope and intercept, the type and amount of correction needed to converge on the optimal buffer depth is known.

An adjustment amount based on the slope and intercept is forwarded to sample rate converter 528. Sample rate converter 528 allows for refined changes to the sample rate of the audio signal. Sample rate converter 528 uses well-established methods for changing the sample rate of the incoming signal to the sample rate required by the speaker. For example, audio data may be input into audio renderer 522 at a rate of 22 kHz, however the speaker requires a signal of 48 kHz. Sample rate converter 528 may adjust the input rate (e.g., 22 kHz) or the output rate (e.g., 48 kHz). Using the slope and intercept, the input rate of the audio data may be adjusted without affecting the output of the data to compensate for the estimated clock drift. Also, since the audio data and video data are synchronized, the rate at which the audio and video is pulled from the buffer is also adjusted. Accordingly, the clock drift is compensated for by adjusting the input rate of the audio data and thereby converging the rate for pulling the packets from the buffer with the rate that the packets are input into the buffer.

In an additional embodiment, receive buffer 512 may be comprised of more than one buffer. With multiple buffers, the aggregated buffer depth is monitored for the received data in receiver 510.

In another embodiment, clock drift convergence controller 540 is included in the splitter or another filter of the filter graph rather than be included as a separate element in system 500.

In still a further embodiment, the amount correction to the input rate for the audio data is selected to avoid possible oscillation of the buffer depth or possible divergence. The amount of correction is selected to converge on the optimal buffer depth quickly while avoiding over-compensation.

Figure 6:
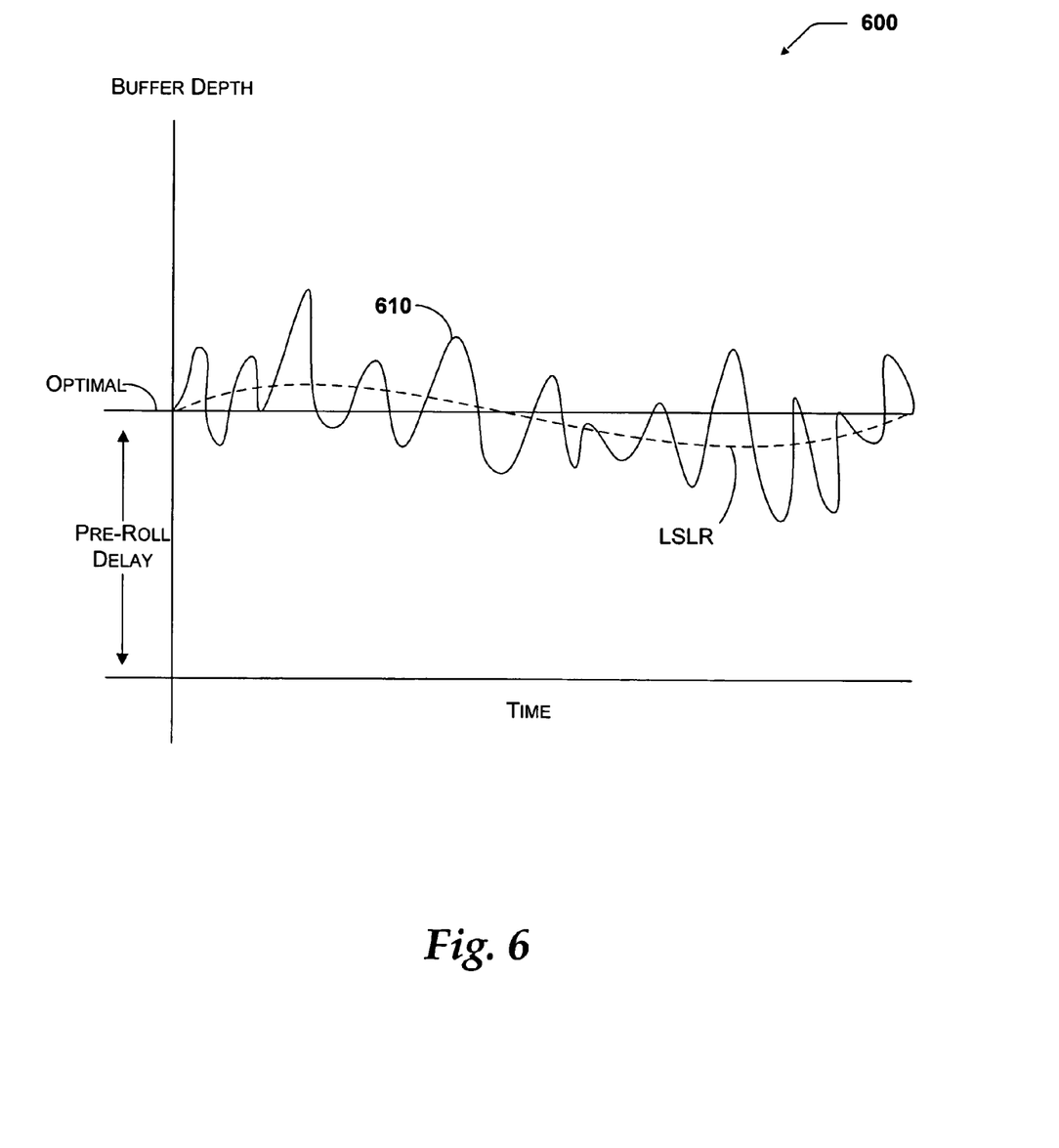
FIG. 6 illustrates an exemplary graph of the buffer depth behavior for an audio/video streaming system in accordance with the present invention.

FIG. 6 illustrates an exemplary graph of the buffer depth behavior for an audio/video streaming system in accordance with the present invention. In graph 600, the buffer depth 610 ranges according to the input and output of packets to and from the buffer. However, as buffer depth is affected by clock drift, the system of the present invention corrects the buffer to cause the buffer depth to converge on the selected optimal buffer depth. The clock rate convergence provide by the present invention may be observed by examining the line (LSLR) representing the least squares linear regression of the buffer depth. The LSLR line, as it moves away from the optimal buffer depth, it also converges back onto the optimal buffer depth due to the correction provided by the present invention. Accordingly, the present invention avoids the danger of skips or pauses by converging the clock rate of the processing the broadcast data for rendering to substantially match a clock rate associated with the transmission of the broadcast data.

It is understood that the responses shown in FIGS. 4 and 6 are exemplary and that they are not representative of actual responses for the buffer depth.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for correcting clock drift associated with a received data stream comprising:
   storing the data stream in a receive buffer according to a first clock rate;
   pulling the data stream from the receive buffer according to a second clock rate, wherein pulling the data stream from the receive buffer according to the second clock rate is initially delayed according to a pre-roll delay that corresponds to an optimal buffer depth;
   processing the data stream pulled from the receive buffer with a filter graph to render and output the data stream;
   estimating a buffer depth fill rate associated with the receive buffer in response to a rate of change and an intersect of a series of instantaneous receive buffer depths;
   estimating a clock drift from the estimated buffer depth fill;
   determining a clock rate adjustment level associated with the estimated clock drift; and
   adjusting the second clock rate associated with rendering the received data stream according to the clock rate adjustment level in response to the rate of change and intersect of the series of instantaneous receive buffer depths, such that the adjustment compensates for the clock drift and converges on a selected buffer depth responsive to the rate of change and intersect of the series of instantaneous receive buffer depths.

2. The method of claim 1, wherein estimating the buffer depth fill rate further comprises recording an instantaneous buffer depth at selected time intervals from the receive buffer.

3. The method of claim 1, wherein estimating the clock drift further comprises performing a least squares linear regression of the buffer depth fill rate to determine the slope and intercept.

4. The method of claim 2, wherein the slope corresponds to a direction associated with the clock drift.

5. The method of claim 2, wherein the intercept corresponds to a difference between the instantaneous buffer depth and the selected buffer depth.

6. The method of claim 1, further comprising determining the selected buffer depth in accordance with a media type associated with the received data stream.

7. The method of claim 1, further comprising determining the selected buffer depth in accordance with a size of the receive buffer.

8. The method of claim 1, wherein determining the clock rate adjustment level further comprises selecting the clock rate adjustment level to avoid oscillation of the buffer depth.

9. The method of claim 1, wherein determining the clock rate adjustment level further comprises selecting the clock rate adjustment level to avoid divergence of the buffer depth.

10. A system for correcting clock drift associated with a received data stream, comprising:
    a receive buffer that is configured to store the received data stream and generate a buffered output, wherein the received data stream is stored in the receive buffer at a first clock rate;
    a filter graph that is configured to retrieve the received data stream from the receive buffer and process the received data stream for rendering;
    a clock rate converter that is configured to provide a second clock rate that is associated with rendering the received data stream;

a clock rate convergence controller that is configured to estimate a clock drift between the first clock rate and the second clock rate as a rate of change and an intercept of buffer depth over time, and is configured to provide a signal to the clock rate converter to adjust the second clock rate so that the second clock rate converges on the first clock rate in response to the rate of change and the intercept of the buffer depth over time;

a decoder that receives the buffered output from the receive buffer to generate decoded packets; and a renderer that receives the decoded packets and the second clock rate to generate output data in response to a second clock signal that has been adjusted to converge with a first clock signal in response to the rate of change and the intercept of the buffer depth over time.

11. The system of claim 10, wherein the clock drift between the first clock rate and the second clock rate is estimated by a measurement of a buffer depth fill rate.

12. The system of claim 10, wherein the receive buffer is comprised of multiple buffers.

13. The system of claim 10, wherein the filter graph includes filters that are arranged to split the received data stream into audio and video components, decode the audio component, decode the video component, render the audio component, and render the video component.

14. The system of claim 13, wherein the second clock rate is based on at least one of a system clock and a hardware clock that is coupled to the filter configured to render the audio component.

15. The system of claim 10, wherein the clock rate convergence controller is further configured to estimate a buffer depth associated with the receive buffer.

16. The system of claim 15, wherein the clock rate convergence controller is further configured to record an instantaneous buffer depth at selected time intervals from the receive buffer to estimate the buffer depth.

17. The system of claim 15, wherein the estimate of the clock drift is based on determining the estimate of the buffer depth.

18. A computer-readable storage medium having computer-executable instructions thereon for correcting clock drift associated with a received data stream, the computer-executable instructions comprising:

storing the data stream in a receive buffer according to a first clock rate;

pulling the data stream from the receive buffer according to a second clock rate; wherein pulling the data stream from the receive buffer according to the second clock rate is initially delayed according to a pre-roll delay that corresponds to an optimal buffer depth;

processing the data stream pulled from the receive buffer with a filter graph to render and output the data stream;

estimating instantaneous buffer depths associated with the receive buffer at selected intervals of time;

combining the instantaneous buffer depths to obtain a buffer depth fill rate by calculating a rate of change between the instantaneous buffer depths by performing a linear regression of the instantaneous buffer depths to determine a slope and an intersect;

estimating a clock drift from the estimated buffer depth fill rate;

determining a clock rate adjustment level associated with the estimated clock drift; and adjusting the second clock rate according to the clock rate adjustment level in response to the slope and the intersect of the instantaneous buffer depths, such that the adjustment compensates for the clock drift and converges on the optimal buffer depth.

19. The computer-readable storage medium of claim 18, wherein estimating the clock drift further comprises performing a least squares linear regression of the buffer depth fill rate to determine the slope and intercept.

20. The computer-readable storage medium of claim 19, wherein the slope corresponds to a direction associated with the clock drift.

21. The computer-readable storage medium of claim 19, wherein the intercept corresponds to a difference between the instantaneous buffer depth and the optimal buffer depth.

22. The computer-readable storage medium of claim 18, wherein determining the clock rate adjustment level further comprises selecting the clock rate adjustment level to avoid at least one of oscillation and divergence of the buffer depth.

* * * * *